(12) United States Patent
Mo et al.

(10) Patent No.: US 11,871,136 B2
(45) Date of Patent: Jan. 9, 2024

(54) IMAGE SENSOR, IMAGE READOUT METHOD FOR READOUT CONVERSION CIRCUIT AND ELECTRONIC DEVICE

(71) Applicant: SMARTSENS TECHNOLOGY (HK) CO., LIMITED, Hong Kong (CN)

(72) Inventors: Yaowu Mo, Shanghai (CN); Liming Tang, Shanghai (CN); Jing Yang, Shanghai (CN); Yanbang Xu, Shanghai (CN); Kun Xiao, Shanghai (CN)

(73) Assignee: SMARTSENS TECHNOLOGY (HK) CO., LIMITED, Hong Kong (CN)

( * ) Notice: Subject to any disclaimer, the term of this patent is extended or adjusted under 35 U.S.C. 154(b) by 0 days.

(21) Appl. No.: 17/732,508

(22) Filed: Apr. 28, 2022

(65) Prior Publication Data
US 2023/0052302 A1     Feb. 16, 2023

(30) Foreign Application Priority Data

Aug. 10, 2021  (CN) .......................... 202110915240.4
Aug. 10, 2021  (CN) .......................... 202121864086.4

(51) Int. Cl.
*H04N 25/78* (2023.01)
*H04N 25/771* (2023.01)
*H04N 25/616* (2023.01)

(52) U.S. Cl.
CPC ........... *H04N 25/78* (2023.01); *H04N 25/616* (2023.01); *H04N 25/771* (2023.01)

(58) Field of Classification Search
CPC ..... H04N 25/616; H04N 25/75; H04N 25/771
See application file for complete search history.

(56) References Cited

U.S. PATENT DOCUMENTS 10,700,697 B2 *   6/2020  Osawa ................... H04N 25/11
2018/0367160 A1 * 12/2018 Osawa ................. H04N 25/767

* cited by examiner

*Primary Examiner* — Nicholas G Giles
(74) *Attorney, Agent, or Firm* — Cheng-Ju Chiang (57) ABSTRACT

The present invention discloses an image sensor, an image readout method, and an electronic device. The image sensor comprises: a pixel array and a plurality of readout conversion circuits, the readout conversion circuit comprises: a comparison circuit for comparing an output signal of the column pixel with a ramp signal to obtain a first output signal and a second output signal; a selection module for selecting the first output signal during a first sampling count, and selecting the second output signal during a second sampling count; a counter for counting according to the first output signal and the second output signal to obtain total quantization value of the first sampling count and the second sampling count, so as to obtain actual signal quantization result according to the total quantization value. The image readout speed of the image sensor is improved.

15 Claims, 5 Drawing Sheets

IMAGE SENSOR, IMAGE READOUT METHOD FOR READOUT CONVERSION CIRCUIT AND ELECTRONIC DEVICE

This application claims priority to a China application No. 202110915240.4, filed Aug. 10, 2021, and a China application No. 202121864086.4, filed Aug. 10, 2021.

TECHNICAL FIELD

The present invention relates to the field of image technologies, in particular to an image sensor, an image readout method, and an electronic device.

BACKGROUND

An image sensor which can convert light into electrical signals, is an important part of a digital camera. It is widely used in electronic devices, such as digital cameras, mobile terminals, and portable electronic devices. Image sensors can include two types, CCD (Charge Coupled Device) image sensors and CMOS (Complementary Metal Oxide Semiconductor) image sensors. CMOS image sensors have the advantages of high integration, low power consumption, high speed and low cost, and have been widely used in many products including mobile phones, tablets, automobiles and security monitoring systems.

Generally, pixel array readout method of the CMOS image sensor adopts a digital correlation double sampling method. Firstly, reset signal is quantized by counting down and counting down result is regarded as start value of a second counting. Secondly, signal is quantized by counting up, thereby realizing correlation double sampling in digital domain through counting twice in opposite direction.

The above-mentioned sampling method needs to switch between counting down and counting up, so it may take a long time to read image of pixel array. In addition, it also needs to add additional holding circuit and switch circuit, which brings high cost.

SUMMARY

In order to overcome the above technical defects, the present invention provides an image sensor, an image readout method, and an electronic device, which improves the image readout speed and needs low cost. The technical solution is as follows:

In a first aspect, an image sensor is provided. The image sensor comprises: a pixel array including a plurality of pixels arranged in rows and columns; and a plurality of readout conversion circuits, each of which corresponds to at least one column of pixels in the pixel array; wherein a readout conversion circuit comprises: a comparison circuit connected to an output terminal of corresponding column pixels, wherein the comparison circuit is for comparing an output signal of the column pixels with a ramp signal to output pulse signal to obtain a first output signal and a second output signal; a selection module connected to the comparison circuit, wherein the selection module is for selecting the first output signal of the comparison circuit during a first sampling count, and selecting the second output signal of the comparison circuit during a second sampling count; a counter connected to an output terminal of the selection module, wherein the counter is for counting according to the first output signal and the second output signal of the comparison circuit to obtain total quantization value of the first sampling count and the second sampling count, so as to obtain actual signal quantization result according to the total quantization value.

In one embodiment of the present invention, the counter counts down twice or counts up twice according to the first output signal and the second output signal of the comparison circuit to obtain the total quantization value.

In one embodiment of the present invention, the comparison circuit comprises a comparator, a first capacitor and a second capacitor, a first input terminal of the comparator is connected to output terminal of corresponding column pixels via the first capacitor, a second input terminal of the comparator receives the ramp signal via the second capacitor.

In one embodiment of the present invention, the comparison circuit comprises a first output terminal and a second output terminal, the first output terminal is for outputting the first output signal, the second output terminal is for outputting the second output signal, and the first output terminal and the second output terminal of the comparator are connected to input terminal of the selection module.

In one embodiment of the present invention, the selection module comprises a first control element and a second control element, the first control element and the second control element are controlled by an output selection control signal, wherein when the output selection control signal is at a first level, the first control element selects the first output signal of the comparison circuit; When the output selection control signal is at a second level, the second control element selects the second output signal of the comparison circuit.

In one embodiment of the present invention, delay time of the path based on the first control element is the same as that of the path based on the second control element.

In one embodiment of the present invention, the selection module is further controlled by a count enable control signal, a high level time period controlled by the count enable control signal corresponds to at least an output time period of the first output signal and an output time period of the second output signal respectively.

In one embodiment of the present invention, the selection module includes a selector and an AND gate circuit which is connected to the selector, the selector receives the first output signal or the second output signal to form a first output signal of the selection module, the AND gate circuit receives the first output signal of the selection module and the count enable control signal to obtain a second output signal of the selection module, the second output signal of the selection module is as an output signal of the selection module.

In one embodiment of the present invention, one input terminal of the counter is connected to the output terminal of the selection module, and the other input terminal of the counter receives a clock signal, the counter is an N-bit counter.

In one embodiment of the present invention, the image sensor further comprises a storage circuit, signals output by the counter are input to the storage circuit for storage.

In one embodiment of the present invention, during the first sampling count, signal result corresponding to the reset signal quantization result is obtained, and during the second sampling count, image signal quantization result is obtained, the actual signal quantization result comprises difference between the image signal quantization result and the reset signal quantization result.

In one embodiment of the present invention, the first sampling count is performed in a first time period, the second sampling count is performed in a second time period, and corresponding preset quantization result is defined in a preset time period, wherein actual reset signal quantization result is equal to the preset quantization result minus quantization result of the first time period to obtain the actual signal quantization result according to the preset quantization result and the total quantization value.

In one embodiment of the present invention, during the first sampling count, when the selection module outputs a first level, the counter starts to count down, and count value of the counter is codex, during the second sampling count, when the selection module outputs the first level, the counter continues to count down based on the first sampling count, and count value of the counter is code_total, code_total=codex+codey, wherein the preset time period is TA, the corresponding preset quantization result is code_TA, the reset signal quantization result is code_rst, code_rst=code_TA−codex, and the actual signal quantization result is code_sig, code_sig=code_total−code_TA.

In one embodiment of the present invention, during the first sampling count, when the selection module outputs a first level, the counter starts to count up, and count value of the counter is codex, during the second sampling count, when the selection module outputs the first level, the counter continues to count up based on the first sampling count, and count value of the counter is code total, code_total=codex+codey, wherein the preset time period is TA, the corresponding preset quantization result is code_TA, the reset signal quantization result is code_rst, code_rst=code_TA−codex, and the actual signal quantization result is code_sig, code_sig=code_total−code_TA.

In a second aspect, an electronic device is provided. The electronic device comprises the above image sensor.

In a third aspect, an image readout method is provided. The method comprises: row selection lines selecting corresponding output rows, and column selection lines outputting output signal of corresponding column pixels to the comparison circuit; the comparison circuit comparing the output signal of the column pixels with a ramp signal and outputting a pulse signal to obtain the first output signal and the second output signal; the selection module selecting the first output signal of the comparison circuit during a first sampling count, and selecting the second output signal of the comparison circuit during a second sampling count; the counter counting according to the first output signal and the second output signal of the comparison circuit to obtain total quantization value of the first sampling count and the second sampling count, so as to obtain actual signal quantization result according to the total quantization value.

The beneficial effects brought by the technical solutions provided by the embodiments of the present invention are:

The image sensor, the image readout method and the electronic device provided by the embodiment compare the column pixel data with the ramp signal through the comparison circuit and output the pulse signal. During the first sampling count, the selection module selects the signal output by the first output terminal of the comparison circuit, and during the second sampling count, selects the signal output by the second output terminal of the comparison circuit. The counter counts according to the signal output by the first output terminal and the signal output by the second output terminal of the comparison circuit to obtain total quantization value of the first sampling count and the second sampling count, so as to obtain actual signal quantization result according to the total quantization value, so that the quantization value of the actual image signal can be obtained only by two one-way sampling count (count down twice or count up twice), and no additional holding circuit and switch circuit are required, which improves the image readout speed of the image sensor and needs low cost.

BRIEF DESCRIPTION OF THE DRAWINGS

In order to more clearly illustrate the technical solutions in the embodiments of the present invention, the drawings used in the description of the embodiments will be briefly described below. It is obvious that the drawings in the following description are only some embodiments of the present invention. For those of ordinary skill in the art, other drawings may also be obtained in light of these drawings without any creative efforts.

Specific embodiments of the present disclosure have been shown by the above-mentioned drawings and will be described in more detail later. These drawings and textual descriptions are not intended to limit the scope of the present disclosure in any way, but to explain the concepts of the present disclosure to those skilled in the art by referring to specific embodiments.

DETAILED DESCRIPTION OF PREFERRED EMBODIMENTS

In order to make the objects, the technical solution and the advantages of the present invention much clear, the embodiments of the present invention will be further described in detail below with reference to the accompanying drawings.

It should be noted that the following specific embodiments may be combined with each other, and the same or similar concepts or processes may not be repeated in some embodiments.

Figure 1:
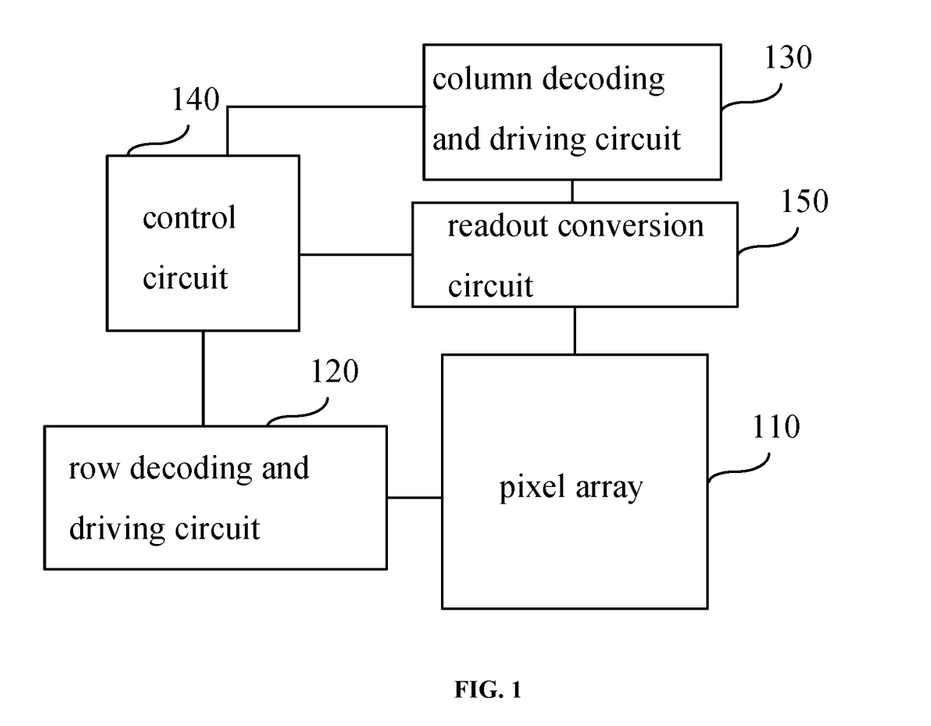
FIG. 1 is a block diagram of an image sensor according to an embodiment of the present invention.
Figure 2:
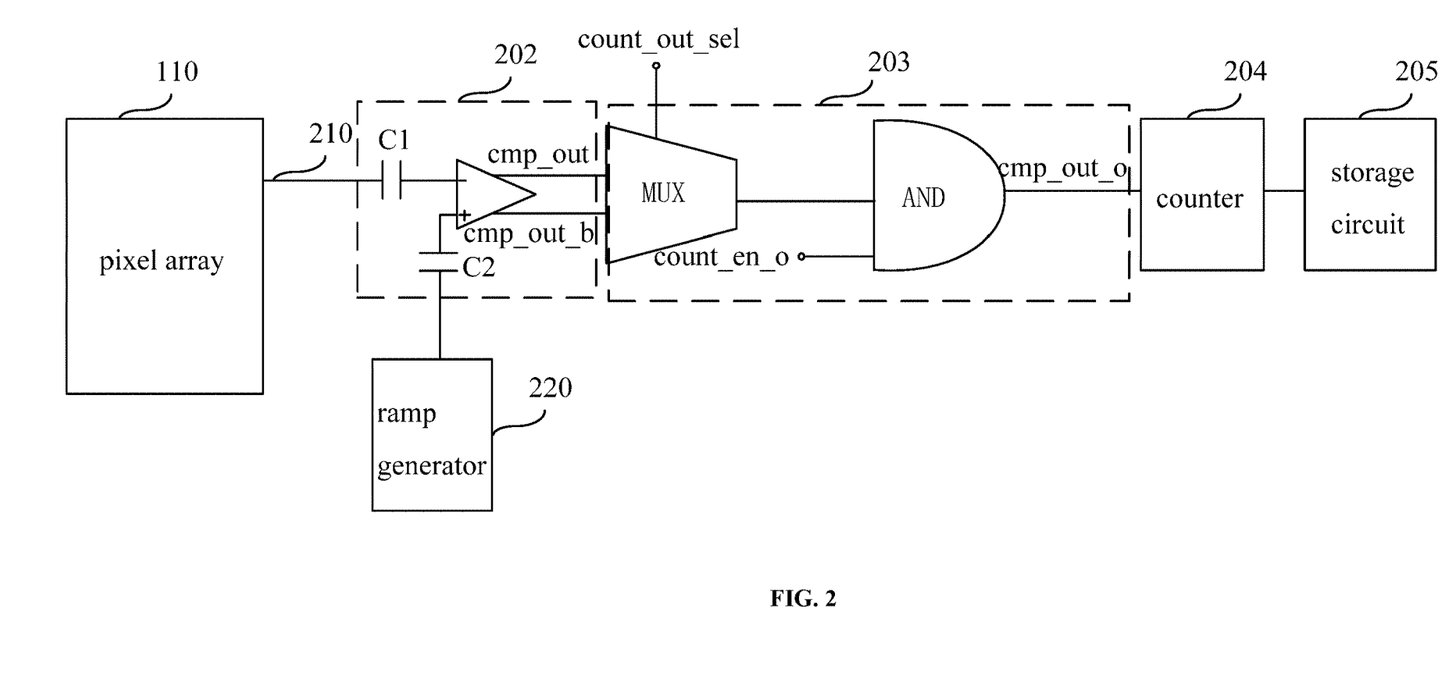
FIG. 2 is a block diagram of a readout conversion circuit of the present invention.
Figure 3:
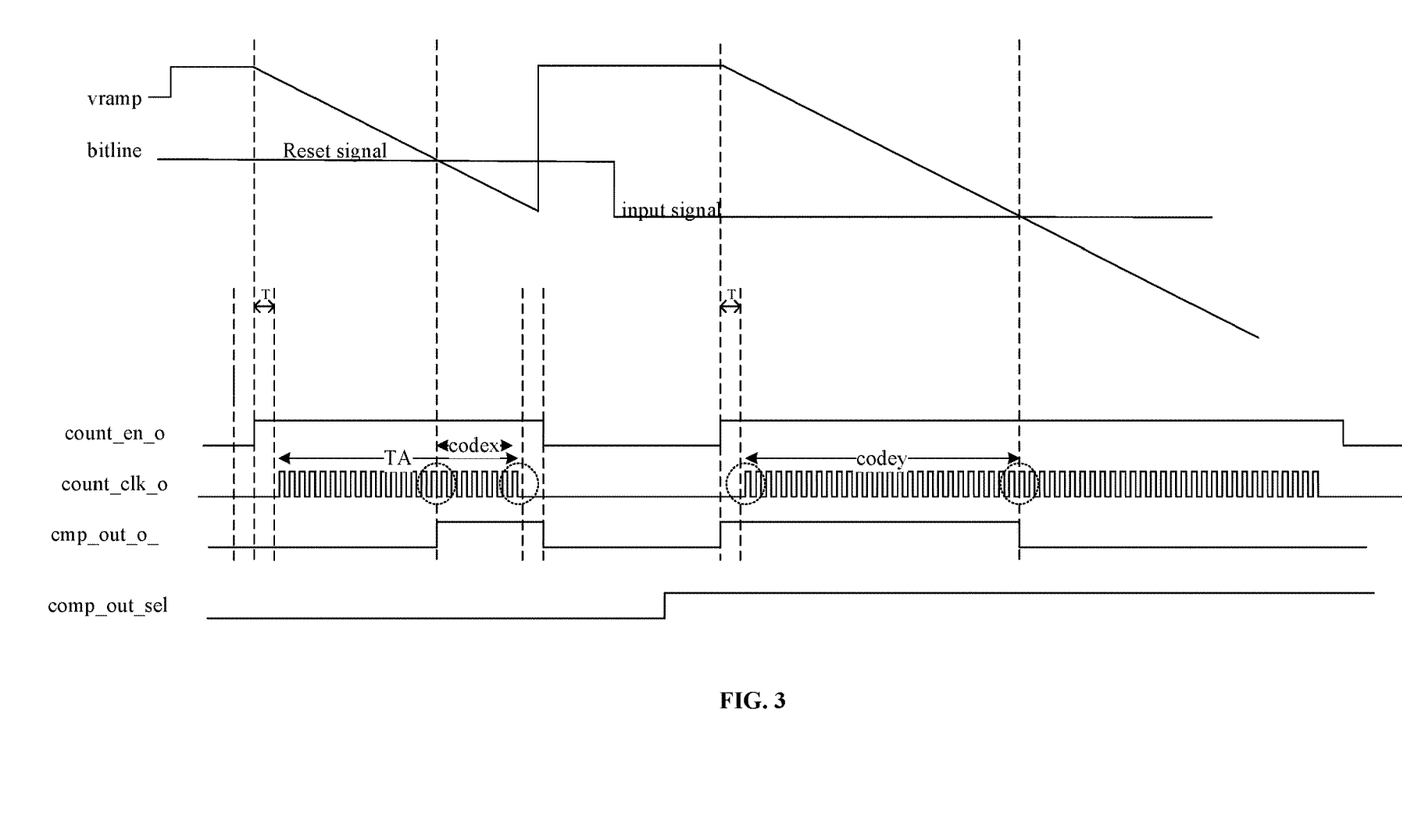
FIG. 3 is a control timing chart of the image sensor when counting down.
Figure 4:
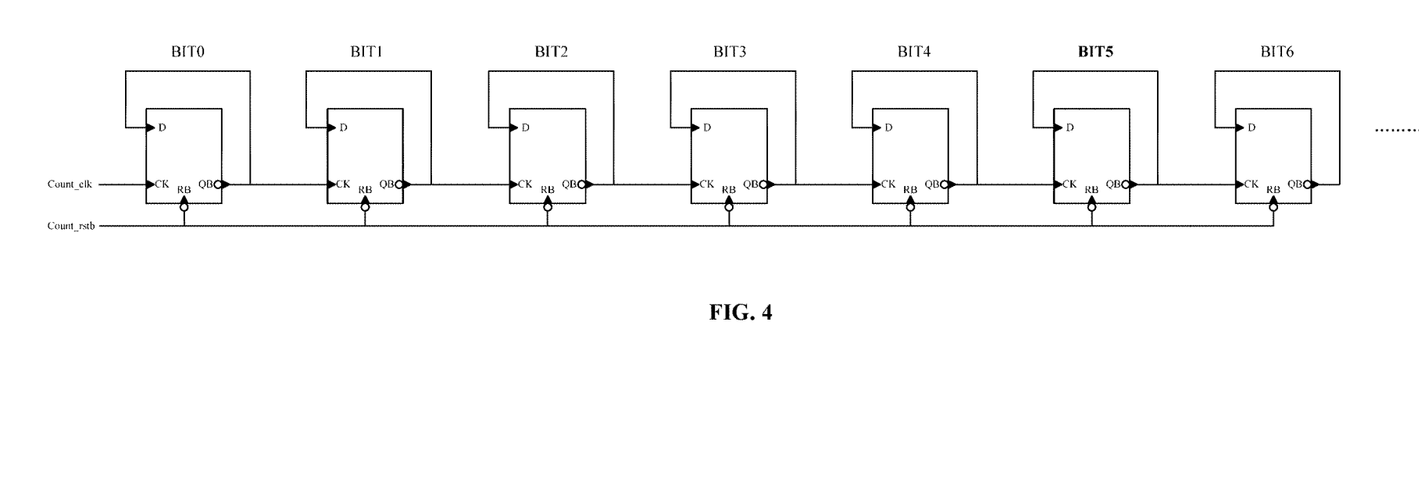
FIG. 4 is a structure diagram of a counter according to an embodiment of the present invention.

FIG. 1 is a block diagram of an image sensor according to an embodiment of the present invention. FIG. 2 is a block diagram of a readout conversion circuit of the present invention. FIG. 3 is a control timing chart of the image sensor when counting down. FIG. 4 is a structure diagram of a counter according to an embodiment of the present invention. Referring to FIGS. 1 to 4, an image sensor according to an embodiment of the present invention includes a pixel array 110. The pixel array 110 includes a plurality of pixels arranged in rows and columns. Each column of pixels in the pixel array 110 is connected to a column selection line, and each row of pixels is connected to a row selection line. Each pixel has a row address and a column address. The row address of the pixel corresponds to the row selection line driven by a row decoding and driving circuit 120, and the column address of the pixel corresponds to the column selection line driven by a column decoding and driving circuit 130. A control circuit 140 controls the row decoding and driving circuit 120 and the column decoding and driving circuit 130 to selectively read out output signals of the pixels corresponding to appropriate rows and columns in the pixel array.

The output signals of the pixels include pixel reset signals and pixel image signals. The pixel reset signals are obtained in floating diffusion region after resetting. The pixel image signals are obtained after charge representing the image obtained by the photosensitive device (such as photodiode) is transferred to the floating diffusion region. Both the pixel reset signals and the pixel image signals are read out by a plurality of readout conversion circuits 150, to output digital image signal to obtain required actual signal.

FIG. 2 is a block diagram of a readout conversion circuit of FIG. 1. Referring to FIG. 2, each readout conversion circuit corresponds to at least one column of pixels in the pixel array. The readout conversion circuit includes a comparison circuit 202, a selection module 203 and a counter 204. FIG. 2 only shows one column output line of a pixel array. In one embodiment, outputs of all pixels of this column of the pixel array are connected to the column output line 210. Of course, in other embodiment, the column pixels may further include clamping pixels which is not connected to the column output line 210.

The comparison circuit 202, the selection module 203 and the counter 204 jointly change analog signals to digital signals. The comparison circuit 202 is connected to an output terminal of corresponding column pixels, which is for comparing an output signal of the column pixels with a ramp signal to output a pulse signal. The width of the pulse signal represents strength of the signal. Wherein, the comparison circuit can obtain at least two output signals, namely, a first output signal and a second output signal. Alternatively, the first output signal and the second output signal are respectively output by a first output terminal cmp_out_b and a second output terminal cmp_out of the comparison circuit.

Specifically, in one embodiment, the comparison circuit 202 includes a comparator, a first capacitor C1 and a second capacitor C2. A first input terminal of the comparator is connected to the output terminal of the column pixels via the first capacitor C1, A second input terminal of the comparator is connected to a ramp generator 220 via the second capacitor C2 to receive the ramp signal. The first output terminal cmp_out_b and the second output terminal cmp_out of the comparator are connected to input terminal of the selection module 203. It should also be noted that the comparison circuit can be realized by any comparator in the prior art that can realize the above functions.

In one embodiment, the image sensor may include the ramp generator 220, which is connected to an input terminal of the comparison circuit for outputting the ramp signal to the comparison circuit. Wherein, the ramp generator 220 can be an existing ramp generator in the prior art to generate pulse wave corresponding to the reset signal and the image signal, so as to obtain actual required image signal by correlation double sampling (CDS).

In one embodiment, an output terminal cmp_out_o of the selection module 203 is connected to one input terminal of the counter 204. The counter 204 may be an N-bit counter, and the other input terminal of the counter 204 receives a clock signal count_clk_o. The counter 204 is for counting the signal output by the selection module 203 to obtain the actual image signal. In one embodiment, the structure of the counter can be shown in FIG. 4.

In one embodiment, the selection module 203 is connected to the comparison circuit for selecting the first output signal of the comparison circuit during a first sampling count, such as the signal output by the first output terminal of the comparison circuit. During a second sampling count, the selection module 203 selects the second output signal of the comparison circuit, such as the signal output by the second output terminal of the comparison circuit. The counter is connected to the output terminal of the selection module 203 and is for counting according to the signal output by the first output terminal and the signal output by the second output terminal of the comparison circuit 202 to obtain total quantization value of the first sampling count and the second sampling count, so as to obtain actual signal quantization result according to the total quantization value. It should be noted that the selection module can be realized by any circuit in the prior art that can realize the above functions.

In one embodiment, the counter counts down twice or counts up twice according to the signal output by the first output terminal and the signal output by the second output terminal of the comparison circuit to obtain the total quantization value. That is, during the first sampling count, the counter 204 counts down, for example, the counter can count down when a rising edge of clock comes; and then, during the second sampling count, the counter 204 continues to count down based on the first sampling count. Similarly, the counter can count up twice.

In one embodiment, the selection module 203 includes a first control element (not shown in FIG. 2) and a second control element (not shown in FIG. 2). The first control element and the second control element are controlled by an output selection control signal count_out_sel (as shown in FIG. 4). In an optional embodiment, the first control element and the second control element can be switches. Wherein, when the output selection control signal is at a first level (e.g., a low level), the first control element selects signal (e.g., the first output signal) output by the first output terminal cmp_out_b of the comparison circuit. When the output selection control signal is at a second level (e.g., a high level), the second control element selects signal (e.g., the second output signal) output by the second terminal cmp_out of the comparison circuit.

In one embodiment, selection delay time of the first control element is the same as that of the second control element. Namely, delay time of the path based on the first control element is the same as that of the path based on the second control element.

In one embodiment, the selection module 203 is also controlled by a count enable control signal count_en_o. A high level time period controlled by the count enable control signal corresponds to at least an output time period of the first output signal and an output time period of the second output signal respectively (as shown in FIG. 2 and FIG. 3).

In one embodiment, as shown in FIG. 2, the selection module 203 includes a selector MUX and an AND gate circuit which is connected to the selector MUX. The selector MUX receives the first output signal and the second output signal to form a first output signal of the selection module. The AND gate circuit receives the first output signal of the selection module and the count enable control signal count_en_o to obtain a second output signal of the selection module. The second output signal of the second selection module is as an output signal of the selection module cmp_out_o.

In one embodiment, as shown in FIG. 2, the image sensor may further include a storage circuit 205, which may be a static random access memory. The counter 204 is connected to the storage circuit 205, and signal output by the counter 204 is input to the storage circuit 205 for storage.

In order to reduce noise and mismatch in pixel arrays and readout circuits, correlated double sample (CDS) technology is used to read out the signal. In an imaging, the reset signal of the pixels and the image signal of the pixels are sampled twice. The N-bit counter performs double correlation sampling. Digital correlation double sampling is to quantize the reset signal and the actual signal respectively and then make a difference in the digital domain, which can offset noise and mismatch of the pixel array and readout circuit, and effectively eliminate system noise.

In one embodiment, during the first sampling count, signal result corresponding to the reset signal quantization result is obtained, and during the second sampling count, the image signal quantization result is obtained. The actual signal quantization result obtained based on the total quantization value includes difference between the image signal quantization result and the reset signal quantization result.

In one embodiment, the first sampling count is performed in a first time period, the second sampling count is performed in a second time period, and corresponding preset quantization result is defined in a preset time period, Wherein the preset time period is equal to sum of the reset signal counting time period and the first time period, that is, actual reset signal quantization result is equal to preset quantization result minus quantization result of the first time period to obtain the actual signal quantization result according to the preset quantization result and the total quantization value. It should be noted that, the actual reset signal is not directly quantized, but is calculated based on the quantization result of the first time period, so as to obtain the actual signal quantization result.

In one embodiment, the selection module is also controlled by the count enable control signal count_en_o. The count enable control signal controls a working time period of the counter to cover the preset time period, that is, the high level time period controlled by the count enable control signal covers the preset time period. Wherein in control process of the count enable control signal count_en_o, timing may include many high level time periods.

In one embodiment, the selection module selects path between the first output terminal of the comparator and the output terminal of the selection module during the first sampling count, and when the selection module outputs a first level (e.g., a high level, as shown in FIG. 3), the counter starts to count down (or count up), and count value of the counter is codex, the time taken to count is the first time period. The selection module selects path between the second output terminal of the comparator and the output terminal of the selection module during the second sampling count, and when the selection module outputs the first level (e.g., a high level, as shown in FIG. 3), the counter continues to count down (or count up) based on the first sampling count, and count value of the counter is code_total, code_total=codex+codey, the time taken to count is the second time period. Wherein the preset time period is TA, the corresponding preset quantization result is code_TA, the preset time period is longer than the first time period, the reset signal quantization result is code_rst, code_rst=code_TA−codex, and the actual signal quantization result is code_sig, code_sig=codey−code_rst=codey−(code_TA−codex)=codey+codex−code_TA=code_total−code_TA.

Specifically, the first sampling count can obtain the reset signal quantization result, that is, during the first sampling count, the selection module 203 selects the path between the first output terminal cmp_out_b of the comparator and the output terminal cmp_out_o of the selection module 203. When the first output terminal cmp_out_b of the comparator outputs a first level (e.g. a high level) (at this time, the selection module also outputs the first level), the counter can count down (or count up) from 0 (e.g., the counter count gradually decreases or increases), and the count value is codex. In addition, for reference quantity TA, the corresponding total count value of the counter is code_TA (e.g., code_TA is the corresponding preset quantization result), TA is the preset time period. Thus, the reset signal quantization result code_rst is obtained, code_rst=code_TA−codex.

The second sampling count can obtain the image signal quantization result, that is, during the second sampling count, the selection module 203 selects path between the second output terminal cmp_out of the comparator and the output terminal cmp_out_o of the selection module 203. When the second output terminal cmp_out of the comparator outputs a first level (e.g. a high level) (at this time, the selection module also outputs the first level), the counter continues to count down (or count up) based on the first sampling count, and the count value of the counter is code_total, in fact, because it is counted based on the previous sampling count, code_total is actually equal to codex+codey, wherein, codey is the actual count value of the second sampling count. The quantization result of the actual output image signal is code_sig, code_sig=codey−code_rst=codey (code_TA−codex)=codey+codex−code_TA=code_total−code_TA. That is, the quantization result of the actual output image signal is code_sig=code_total−code_TA. In this way, the two counts are counted down (or up), without additional holding circuit and switch circuit, which improves the image readout speed and needs low cost.

FIG. 3 is a control timing chart of the image sensor when counting down. Referring to FIG. 3, the control timing chart can be applied to the readout conversion circuit of FIG. 2. Bitline represents the output signal of pixels, vramp represents the output signal of the ramp generator, cmp_out_o represents the output signal of the selection module, count_clk_o represents clock signal, count_en_o represents the count enable control signal, comp_out_sel represents the output selection control signal.

In one embodiment, start point of codex stage is intersection of the output signal vramp of the ramp generator and the output signal bitline of pixels, and the codex stage is corresponding to the time period of the ramp signal is less than the pixel output signal. In one embodiment, referring to FIG. 3, the selected first time period has a certain time extension at the end relative to the above time period corresponding to the codex stage. In addition, the second time period of the second sampling count corresponds to the time period when the ramp signal is greater than pixel output during the image signal is output. In one embodiment, referring to FIG. 3, the selected second time period has a certain time extension T before the start of sampling relative to the above time period. In addition, the preset time period TA may be a time period in which the corresponding ramp signal is greater than the pixel output when the reset signal is output, and further extends to include the first time period. In one embodiment, referring to FIG. 3, the selected preset time period has a certain time extension T before the start of sampling relative to the above time period.

In this invention, the image signal is well processed by the readout conversion circuit to obtain the quantization value of the actual output image signal. Specifically, the comparator compares the output signal of the pixels of the pixel array with the ramp signal of the ramp signal generator, and outputs the pulse signal. The width of the pulse signal represents strength of the signal. By counting the pulse signal down twice (or up) twice by the counter, the quantization result of the actual output image signal is obtained, which includes difference between the image signal quantization result and the reset signal quantization result.

Based on the same concept as the above embodiments, one embodiment of the invention further provides an electronic device, which includes an image sensor in the above-mentioned embodiment. The electronic device can be a camera, a mobile phone, a personal digital assistant, a computer, a monitoring device, a machine vision device, etc.

The image sensor and the electronic device provided by the embodiment compare the column pixel data with the ramp signal through the comparison circuit and output the pulse signal. During the first sampling count, the selection module selects the signal output by the first output terminal of the comparison circuit, and during the second sampling count, selects the signal output by the second output terminal of the comparison circuit. The counter counts according to the signal output by the first output terminal and the signal output by the second output terminal of the comparison circuit to obtain total quantization value of the first sampling count and the second sampling count, so as to obtain actual signal quantization result according to the total quantization value, so that the quantization value of the actual image signal can be obtained only by two sampling count, and no additional holding circuit and switch circuit are required, which improves the image readout speed of the image sensor and needs low cost.

The following is the method embodiment of the present invention. For details not described in the method embodiment, please refer to the above corresponding device embodiment.

Figure 5:
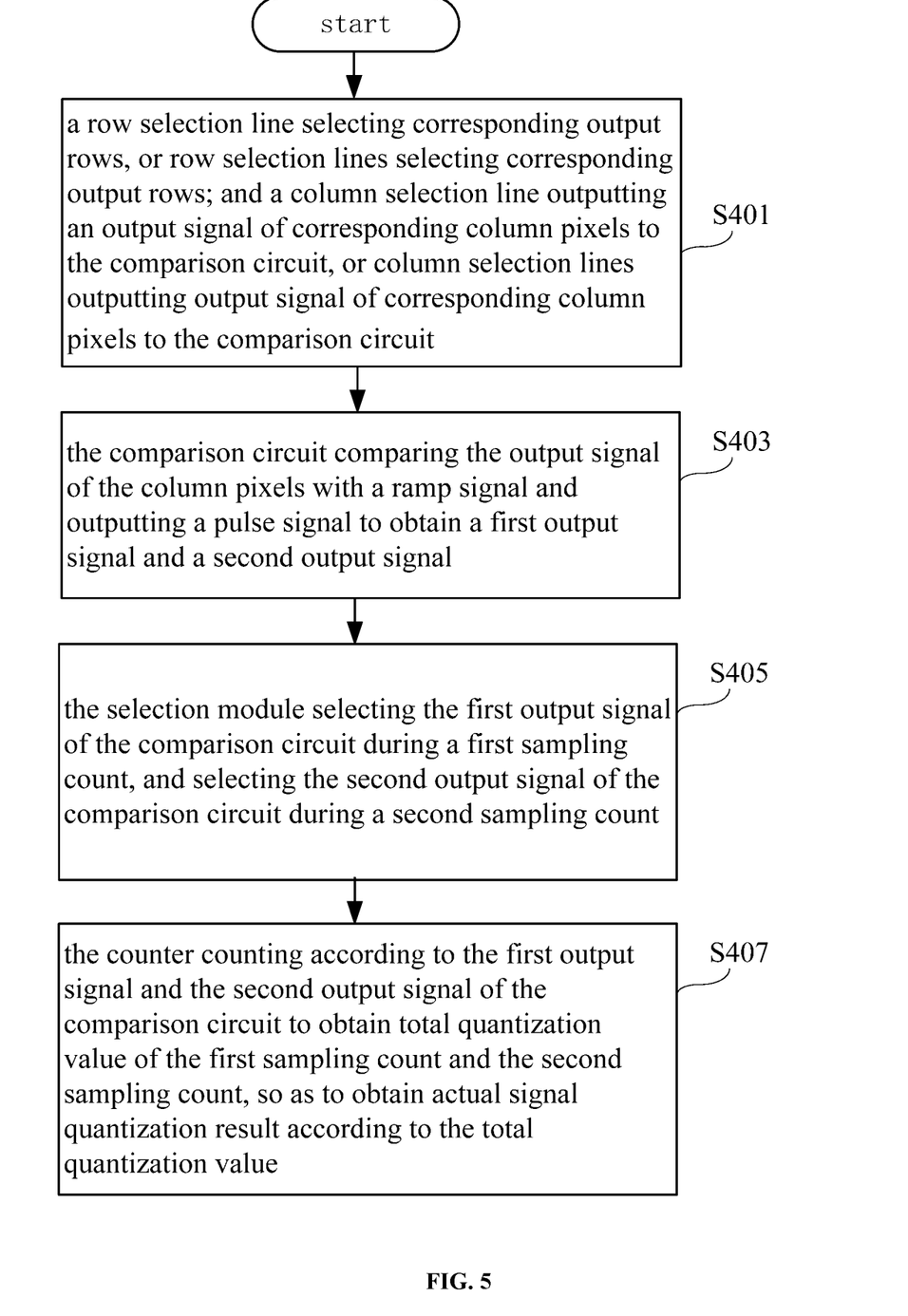
FIG. 5 is a flow diagram of an image readout method of an image sensor according to an embodiment of the present invention.

FIG. 5 is a flow diagram of an image readout method of an image sensor according to an embodiment of the present invention. The image readout method of the image sensor is realized by the image sensor provided by the invention. That is, before performing first step of the method, an image sensor according to any one of the above-mentioned embodiments is provided. Then, each step of the method is performed according to the image sensor. Of course, the readout method provided by the invention can also be realized by other sensors. Referring to FIG. 5, the image readout method of the image sensor is applied to the image sensor and the electronic device. The image readout method of the image sensor in this embodiment includes the following steps:

Step S401, a row selection line selecting corresponding output rows, or row selection lines selecting corresponding output rows; and a column selection line outputting an output signal of corresponding column pixels to the comparison circuit, or column selection lines outputting output signal of corresponding column pixels to the comparison circuit.

Step S403, the comparison circuit comparing the output signal of the column pixels with a ramp signal and outputting a pulse signal to obtain a first output signal and a second output signal.

Step S405, the selection module selecting the first output signal of the comparison circuit during a first sampling count, and selecting the second output signal of the comparison circuit during a second sampling count.

Step S407, the counter counting according to the first output signal and the second output signal of the comparison circuit to obtain total quantization value of the first sampling count and the second sampling count, so as to obtain actual signal quantization result according to the total quantization value.

Specifically, step S407, a counter counting according to the first output signal and the second output signal of the comparison circuit to obtain total quantization value of the first sampling count and the second sampling count, further includes: the counter counting down twice or counting up twice according to the signal output by the first output terminal and the signal output by the second output terminal of the comparison circuit to obtain the total quantization value.

Specifically, step S407 can also be refined into the following steps:

The counter counting down twice or counting up twice according to the signal output by the first output terminal and the signal output by the second output terminal of the comparison circuit to obtain the total quantization value.

In one embodiment, performing the first sampling count during a first time period, performing the second sampling count in a second time period, and preset quantization result is defined in a preset time period, Wherein the preset time period is equal to sum of the reset signal counting time period and the first time period, so as to obtain the actual signal quantization result according to the preset quantization result and the total quantization value.

In one embodiment, during the first sampling count, the selection module selecting path between the first output terminal of the comparator and the output terminal of the selection module, and when the selection module outputs a first level, the counter starts to count down or count up, and the count value of the counter is codex. During the second sampling count, when the selection module outputs the first level, the counter continues to count down or count up based on the first sampling count, and the count value of the counter is code_total, code_total=codex+codey, wherein the preset time period is TA, the corresponding preset quantization result is code_TA, the reset signal quantization result is code_rst, code_rst=code_TA−codex, and the actual signal quantization result is code_sig, code_sig=code_total−code_TA.

The image readout method of the image sensor provided by the embodiment compares the column pixel data with the ramp signal through the comparison circuit and output the pulse signal. During the first sampling count, the selection module selects the signal output by the first output terminal of the comparison circuit, and during the second sampling count, selects the signal output by the second output terminal of the comparison circuit. The counter counts according to the signal output by the first output terminal and the signal output by the second output terminal of the comparison circuit to obtain total quantization value of the first sampling count and the second sampling count, so as to obtain actual signal quantization result according to the total quantization value, so that the quantization value of the actual image signal can be obtained only by two sampling count, and no additional holding circuit and switch circuit are required, which improves the image readout speed of the image sensor and needs low cost.

A person skilled in the art may understand that implementing all or part of the steps in the above embodiments may be completed by hardware, or may be executed by a computer program to instruct related hardware, and the computer program may be stored in a computer readable storage medium. The storage medium mentioned may be a read only memory, a magnetic disk, an optical disk, and the like.

The above are only the preferred embodiments of the present invention, and are not intended to limit the present invention. Any modifications, equivalents, improvements, etc., which are within the scope of the present invention, should be included in the protection scope of the present invention.

What is claimed is:

1. An image sensor, comprising:
a pixel array including a plurality of pixels arranged in rows and columns; and
a plurality of readout conversion circuits, each of which corresponds to at least one column of pixels in the pixel array;
wherein a readout conversion circuit comprises:
a comparison circuit connected to an output terminal of corresponding column pixels, wherein the comparison circuit is for comparing an output signal of the column pixels with a ramp signal to output a pulse signal to obtain a first output signal and a second output signal;
a selection module connected to the comparison circuit, wherein the selection module is for selecting the first output signal of the comparison circuit during a first sampling count, and selecting the second output signal of the comparison circuit during a second sampling count;
a counter connected to an output terminal of the selection module, wherein the counter is for counting according to the first output signal and the second output signal of the comparison circuit to obtain a total quantization value of the first sampling count and the second sampling count, so as to obtain an actual signal quantization result according to the total quantization value.

2. The image sensor according to claim 1, wherein the counter counts down twice or counts up twice according to the first output signal and the second output signal of the comparison circuit to obtain the total quantization value.

3. The image sensor according to claim 1, wherein the comparison circuit comprises a comparator, a first capacitor and a second capacitor, a first input terminal of the comparator is connected to an output terminal of corresponding column pixels via the first capacitor, a second input terminal of the comparator receives the ramp signal via the second capacitor; and/or, the comparison circuit comprises a first output terminal and a second output terminal, the first output terminal is for outputting the first output signal, the second output terminal is for outputting the second output signal, and the first output terminal and the second output terminal of the comparator are connected to an input terminal of the selection module.

4. The image sensor according to claim 1, wherein the selection module comprises a first control element and a second control element, the first control element and the second control element are controlled by an output selection control signal, wherein when the output selection control signal is at a first level, the first control element selects the first output signal of the comparison circuit; when the output selection control signal is at a second level, the second control element selects the second output signal of the comparison circuit.

5. The image sensor according to claim 4, wherein delay time of the path based on the first control element is the same as that of the path based on the second control element.

6. The image sensor according to claim 1, wherein the selection module is further controlled by a count enable control signal, a high level time period controlled by the count enable control signal corresponds to at least an output time period of the first output signal and an output time period of the second output signal respectively.

7. The image sensor according to claim 6, wherein the selection module includes a selector and an AND gate circuit which is connected to the selector, the selector receives the first output signal and the second output signal to form a first output signal of the selection module, the AND gate circuit receives the first output signal of the selection module and the count enable control signal to obtain a second output signal of the selection module, the second output signal of the selection module is as an output signal of the selection module.

8. The image sensor according to claim 1, wherein one input terminal of the counter is connected to the output terminal of the selection module, and an other input terminal of the counter receives a clock signal, wherein the counter is an N-bit counter.

9. The image sensor according to claim 1, wherein the image sensor further comprises a storage circuit, signals output by the counter are input to the storage circuit for storage.

10. The image sensor according to claim 1, wherein during the first sampling count, a signal result corresponding to a reset signal quantization result is obtained, and during the second sampling count, an image signal quantization result is obtained, the actual signal quantization result comprises difference between the image signal quantization result and the reset signal quantization result.

11. The image sensor according to claim 10, wherein the first sampling count is performed in a first time period, the second sampling count is performed in a second time period, and a corresponding preset quantization result is defined in a preset time period, wherein an actual reset signal quantization result is equal to the preset quantization result minus a quantization result of the first time period to obtain the actual signal quantization result according to the preset quantization result and the total quantization value.

12. The image sensor according to claim 11, wherein during the first sampling count, when the selection module outputs a first level, the counter starts to count down or count up, and a count value of the counter is codex, during the second sampling count, when the selection module outputs the first level, the counter continues to count down or count up based on the first sampling count, and the count value of the counter is code_total, code_total=codex+codey, wherein the code_total is the total quantization value, the codex is the count value of the first sampling count, the codey is an actual count value of the second sampling count, wherein the preset time period is TA, the corresponding preset quantization result is code_TA, the reset signal quantization result is code_rst, code_rst=code_TA−codex, and the actual signal quantization result is code_sig, code_sig=code_total−code_TA.

13. An electronic device, comprising:
the image sensor according to claim 1.

14. An image readout method, comprising:
a row selection line selecting output rows, and a column selection line outputting an output signal of column pixels to a comparison circuit;
the comparison circuit comparing the output signal of the column pixels with a ramp signal and outputting a pulse signal to obtain a first output signal and a second output signal;
a selection module selecting the first output signal of the comparison circuit during a first sampling count, and selecting the second output signal of the comparison circuit during a second sampling count;
a counter counting according to the first output signal and the second output signal of the comparison circuit to obtain a total quantization value of the first sampling count and the second sampling count, so as to obtain an actual signal quantization result according to the total quantization value.

15. The method according to claim 14, wherein the image readout method is implemented by an image sensor comprising:
- a pixel array including a plurality of pixels arranged in rows and columns; and
- a plurality of readout conversion circuits, each of which corresponds to at least one column of pixels in the pixel array;

wherein a readout conversion circuit comprises:

the comparison circuit connected to an output terminal of corresponding column pixels, wherein the comparison circuit is for comparing the output signal of the column pixels with the ramp signal to output the pulse signal to obtain the first output signal and the second output signal;

the selection module connected to the comparison circuit, wherein the selection module is for selecting the first output signal of the comparison circuit during the first sampling count, and selecting the second output signal of the comparison circuit during the second sampling count;

the counter connected to an output terminal of the selection module, wherein the counter is for counting according to the first output signal and the second output signal of the comparison circuit to obtain the total quantization value of the first sampling count and the second sampling count, so as to obtain the actual signal quantization result according to the total quantization value.

* * * * *